F. A. HEADSON.
BRAKE BAND, BRAKE SHOE, AND LINING THEREFOR.
APPLICATION FILED MAY 12, 1913.
1,264,924.
Patented May 7, 1918.
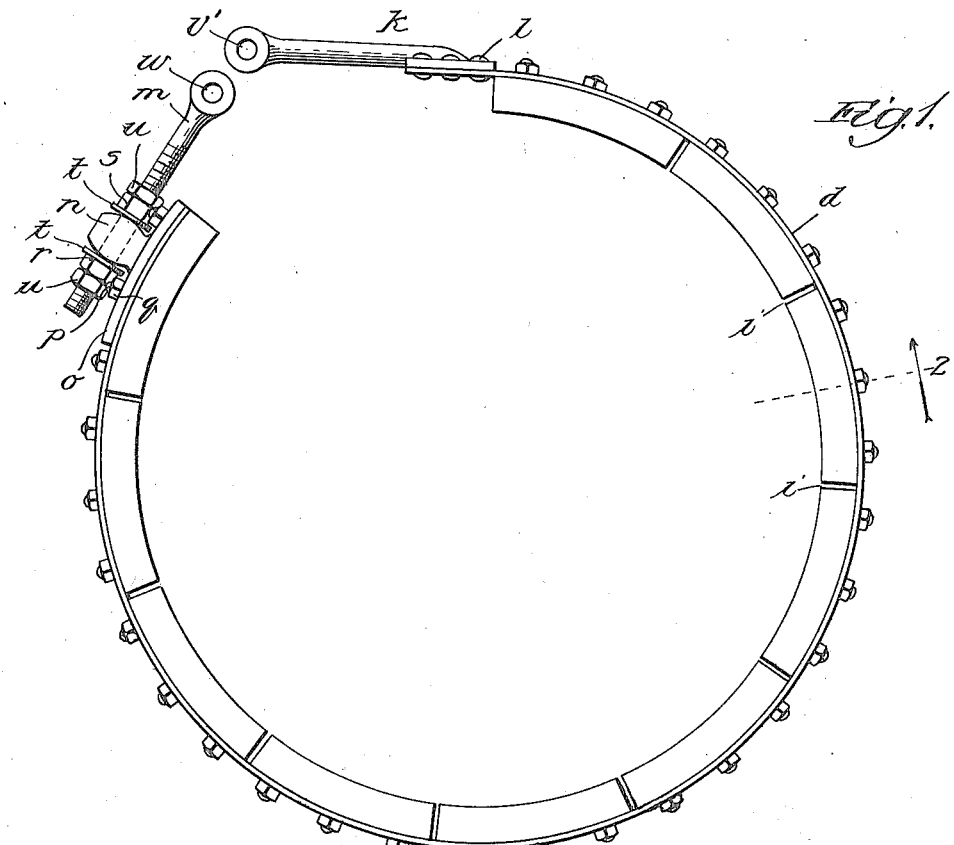
Fig. 1.
Fig. 2.
Fig. 3. Fig. 4.
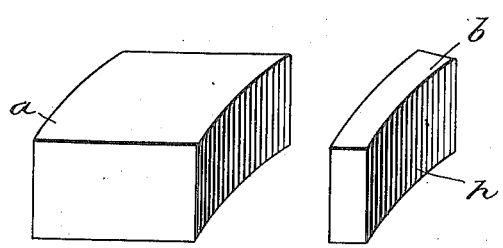
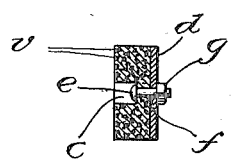
Witnesses:
Inventor:
Frank A. Headson,
By Poole & Cromer
Attys

UNITED STATES PATENT OFFICE.

FRANK A. HEADSON, OF MILWAUKEE, WISCONSIN, ASSIGNOR TO H. W. JOHNS-MANVILLE COMPANY, OF MILWAUKEE, WISCONSIN, A CORPORATION OF NEW YORK.

BRAKE-BAND, BRAKE-SHOE, AND LINING THEREFOR.

1,264,924.            Specification of Letters Patent.      Patented May 7, 1918.

Application filed May 12, 1913. Serial No. 766,953.

*To all whom it may concern:*

Be it known that I, FRANK A. HEADSON, a citizen of the United States, and a resident of Milwaukee, in the county of Milwaukee and State of Wisconsin, have invented certain new and useful Improvements in Brake-Bands, Brake-Shoes, and Linings Therefor; and I do hereby declare that the following is a full, clear, and exact description thereof, reference being had to the accompanying drawings, and to the letters of reference marked thereon, which form a part of this specification.

This invention relates to brake bands or brake shoes and linings therefor. It relates particularly to that class of brake bands or brake shoes or linings therefor in which a lining comprising fibrous material is adapted to be secured to a metallic band or supporting member and thereby held in engagement with a wheel or other part for stopping, controlling, or preventing the rotation or movement of the wheel or part engaged.

The principal object of the invention is to provide a simple, economical and efficient brake band or brake shoe or lining therefor.

Other and further objects of the invention will appear from an examination of the accompanying drawings which are made a part hereof and from the following description and claims.

The invention consists in the features, combinations, and details of construction herein described and claimed.

In the accompanying drawings—

Figure 1 is a view in elevation of a brake band provided with a sectional lining or lining formed of segmental blocks, or parts constructed in accordance with my invention and improvements;

Fig. 2, a view in cross-section taken on line 2 of Fig. 1, looking in the direction of the arrow, and showing the manner of connecting the lining or inner segmental members of the brake band or shoe with the outer metallic supporting member;

Fig. 3, a perspective view of a section or block of material of which the lining or segmental sections or blocks of the lining are to be formed, showing the mass or pulp as it would appear before being molded or submitted to the required heat and pressure for compressing the fibrous material and vulcanizing the cementitious material of which the lining or lining block is formed; and Fig. 4, a perspective view of a finished block or segmental portion of a brake-lining, as it would appear after the operation of molding and the application of the required heat and pressure has been completed.

A brake band or brake shoe constructed as herein described or having a lining comprising compressed fibrous asbestos and rubber cement or cementitious material vulcanized or subjected to the action of heat while under pressure or while in a mold or form after having the required pressure applied and, by preference, containing metal such as brass or copper in small pieces or fragments or in the form of pieces of wire embedded in the fibrous material and cementitious material or vulcanized rubber, is adapted to enable great pressure to be applied to the brake and a suitable engagement to be obtained between the brake lining and the wheel or part engaged so that a moving part or wheel may be stopped and held stationary or may have its speed reduced or controlled without danger of injury to the parts by reason of a too sudden stopping, and the required frictional engagement may be obtained and maintained without causing unnecessary shock to the parts and without injury to the lining or parts by reason of friction and heat.

In constructing a brake band or brake shoe provided with a lining made in accordance with my invention and improvements, I provide a suitable quantity of material consisting of or including fibrous asbestos which may be in the form of fragments of fabric or asbestos cloth consisting of or comprising remnants or waste material remaining from or produced incidentally to or during the manufacture of packing, belting or similar articles of manufacture containing fibrous material or rubber or both, or may contain fibrous asbestos in any desired form. The fibrous material, when it consists of remnants or fragments of packing, belting or asbestos cloth or fabric or fibrous material remaining after or resulting from the manufacture of packing, belting or other articles of manufacture containing fibrous asbestos, commonly contains or has intermixed therewith a quantity of rubber, rubber cement or cementitious material containing rubber which may be in a more or less pliable condition and may be to a greater or less extent vulcanized or in part vulcanized. Such material may also contain a quantity of metal, ordinarily in the form of copper or brass wire along with the fibrous material and rubber or cementitious material, all of which is thoroughly ground and disintegrated with the fibrous material or asbestos. A suitable proportion of a metallic element such as brass or copper wire or filings or metallic shavings may be provided, and may be ground or disintegrated separately from the fibrous material and intermixed therewith. A suitable quantity of fresh or new rubber, or cementitious material comprising rubber and other ordinary and well known elements, which in common practice form what is known as rubber cement, is added to the mass of fibrous material, all of said elements being intermixed in suitable proportions with or without the metal so as to form a pulp or mass of material suitable for forming the lining for brake shoes, brake bands or other or similar articles of manufacture. The fibrous material contained in the pulp or mass may consist entirely of fibrous asbestos or it may comprise fibrous asbestos intermixed with hemp, jute or other fibrous organic material in suitable proportions.

When rubber in the form of such residue or remnants is used, it is immersed in or subjected to the action of benzin or gasolene and the benzin or gasolene thus cuts the rubber and is allowed to evaporate, thus providing the proper rubber solution. Rubber, either in the form of new rubber or old rubber or of remnants and new rubber may thus be cut by means of benzin or gasolene. The rubber solution formed in a suitable manner is intermixed with the fibrous material while the rubber or rubber solution is in a liquid, plastic or semi-vulcanized or semi-cured condition. A pulp or material is thus obtained which, in the mass, comprises rubber or cementitious material containing rubber in a liquid, plastic or semi-vulcanized condition and fibrous asbestos and, by preference, a desired proportion of finely divided metal such as brass or copper, either with or without a desired proportion of hemp, jute or other fibrous organic material. But whether rubber in the form of such remnants or residue is used or not, a sufficient proportion of new rubber should be intermixed with the fibrous material forming the mass or pulp, and the mass, including the fibrous material and rubber or cementitious material and, by preference, particles of brass or copper, is placed in a mold while the rubber solution is in a liquid, plastic, non-vulcanized or partially vulcanized condition and subjected to pressure and sufficient heat to vulcanize the rubber or rubber solution as hereinafter more particularly described, the pressure and heat being sufficient and being so applied as to reduce the material to the desired density, size and shape.

The mold may be of any desired, ordinary or well known form of mold provided with suitable means for applying the required pressure and sufficient heat for vulcanizing the rubber or rubber solution, and it is therefore deemed unnecessary to illustrate or describe such a mold. Such a mold should have side and end walls and upper and lower relatively movable mold plates, all adapted to form a mold chamber having the same shape and dimensions as the article or molded piece to be obtained, the chamber formed by the mold being of such dimensions that when the mold plates are separated the mold will admit between the side and end walls and top and bottom plates or movable and stationary parts of the mold the required quantity of pulp or compressible material for forming a block or section of lining or pad or other article of the desired size and shape.

The required heat is applied, by preference, by admitting steam into contact with the mold plates or with the mold plates and mold during the operation of compressing the pulp or material, although it is possible to first compress the material and then, before vulcanizing or after partially vulcanizing, to place it in a form and subject it to heat sufficient to vulcanize the rubber or cementitious material, as desired. The pulp or compressed material is allowed to cool, after being subjected to the required degree of heat and pressure or to the action of the steam at the required temperature and for the required length of time to suitably vulcanize the rubber or cementitious material. A hydraulic pressure of 2500 pounds to the square inch for brake linings or similar articles of manufacture, applied by preference while the material is in a heated and more or less plastic or compressible condition, and which may be maintained during the cooling, if desired, is found in practice to be sufficient to accomplish the desired result.

The brake shoe lining or the material or composition suitable for the lining of a brake shoe embodying my invention in a very desirable form comprises and may consist of the following elements: (1) fibrous material or asbestos, (2) rubber or cementitious material containing rubber and sulfur, and, when desired, (3) a metallic element such as copper or brass or similar material in comminuted or finely divided condition.

The first mentioned element or fibrous material may consist wholly of fibrous asbestos, or of fibrous asbestos and organic fibrous material, such as hemp, jute or other similar fibrous material in any desired proportion.

The second element, the binder, rubber or cementitious material containing rubber, may consist of rubber, or of cementitious material containing rubber and sulfur, and a filler or body-forming material or substance. Such body-forming material may consist of or comprise zinc, whiting, barytes or blue lead, or either of these in combination with any or all of the other of said elements. A very desirable form of such binder, cementitious material or rubber solution, comprises or consists of the following elements in approximately the proportions mentioned, as follows: rubber 30%; barytes 39%; pulp 5%; lime 2%; litharge 2%; sulfur 8%; blue lead 14%.

The third element, metal is, by preference, in the form of copper or brass in a finely divided or comminuted condition, such as wire or shreds of metal cut into small pieces, or it may include filings or shavings of brass or copper.

The lining material or composition of which the lining members or pieces $b$ are formed thus consists, by preference, of or comprises the above-mentioned elements in approximately the following proportions: fibrous material or asbestos, or the first-mentioned element, 68%; rubber or cementitious material containing rubber and sulfur and forming a binder, or the second element, 30%; and metal such as brass or copper, or the third-mentioned element, 2%.

The relative proportions of the elements above mentioned are by weight and may be varied greatly, as desired or required by varying conditions, and the relative proportions of hemp, jute or other organic fibrous material, the rubber or cement and the metallic element in the form of brass or copper or similar material may be increased or decreased or varied to any desired extent consistent with the obtaining of a lining material of suitable density, strength and durability and efficiency to withstand the stresses and strains and the effects of friction and the variations in the temperature to which the material is subjected in use, and of such consistency and pliability and at the same time possessing sufficient rigidity to provide sufficient friction or frictional resistance to the movement of the wheel or part to which the brake is to be applied, and to enable the required frictional engagement between the brake and the engaged part to take effect gradually and finally become more firm and more unyielding although the load may be heavy. I therefore contemplate the use of fibrous material consisting wholly of fibrous asbestos and without any organic material, when desired, and I do not limit myself to the use of the exact elements above set forth or to the proportions of such elements except as set forth in the claims.

The particles of metal $v$ are larger or coarser than particles of powder and of sufficient size so that they are adapted to be held embedded in the surrounding fibrous and cementitious material and are not dislodged when subjected to friction sufficient to gradually wear away the metallic pieces while the latter remain embedded in the fibrous material. The metallic particles, however, are, by preference, so small and so separated by the fibrous material in which they are embedded that the heat produced by friction on the exposed particles will not be so great but that it will be prevented from radiating to the adjacent inner metallic particles to an extent which would cause undue heating of the device or lining, such over-heating being prevented and such radiation of heat from the exposed metallic particles to others of the embedded particles of metal being prevented or reduced to a minimum by the asbestos, or fibrous and cementitious material which forms an insulating body of relatively low heat-conductivity or a non-conductor of heat between and surrounding the metallic particles.

The mass of pulp or fibrous and cementitious material and, by preference, containing particles of metal embedded therein is subjected to heat and pressure sufficient to reduce the mass in bulk to, by preference, less than one-third of its original bulk or more than three times its original density while the cementitious material is in an adhesive, soft liquid, or semi-vulcanized condition, the heat being maintained or applied and the material being maintained in its compressed condition by means of a mold or form or other suitable means, until the substance or cementitious material becomes sufficiently hardened or vulcanized. The cementitious material is then allowed to cool and to become set or hardened, as above suggested. The heat and pressure is such that the bulk of the material in practice is reduced to from one-fourth to one-fifth or even one-sixth of its original bulk or dimensions. A very compact, strong and durable material or substance is thus provided having a compression strength greatly in excess of that of hard wood, and of greater density than hard wood. Its compression strength is in fact more than four times as great as that of hard wood, and it is far more efficient in operation than metal.

Each block or section of lining material $b$ is secured to the inner or outer side of a metallic brake band member, clutch or brake shoe member $d$ which may be made in the form of a flexible metallic band or of any desired suitable form. In order to accomplish this in a simple and efficient manner each segmental lining member or block b is provided with a suitable number of apertures c therein, as shown in Fig. 2, and headed bolts e are inserted through the openings c with the heads of the bolts, by preference, in said openings, said bolts extending through suitable corresponding openings f in the brake band or metallic brake member d and having nuts g in threaded engagement with the threaded ends of said bolts, the nuts thus being adapted to securely hold the sections or lining members b in position. The sections b each have an inner concave face h which is in the form of a segment of a circle corresponding with the peripheral or circumferential face of the wheel or part to which the brake is to be applied, and is adapted to engage the outer peripheral surface of such a wheel or part. The outer convex faces of the blocks or segments b are also segmental and in the form of an arc of a circle corresponding with the circle described by the inner peripheral face of the flexible brake band or metallic member d when the segmental lining members are in position to engage the peripheral surface of the wheel or member to which the brake is adapted to be applied. The segmental lining members b are mounted on the inner or concave side of the brake band or metallic supporting member d a sufficient distance apart to provide spaces i between the adjacent ends of such segmental members or blocks b, the blocks being of such length and the spaces i being sufficient in number and so located as to permit the band or metallic member d to have the desired flexibility to enable it to be drawn together or bent into position to encircle the wheel or part to be engaged in such a manner that the inner concave faces of the segmental lining members b will snugly fit the periphery of the wheel or part to which the brake is to be applied, or to be spread or extended to releasing position, as desired. The means for operating the brake shoe or brake band may be of any desired, ordinary or well known form.

In the accompanying drawings, one end of the metallic member d is provided with a rod k secured to the end of the brake band or metallic member d by means of rivets l, or in any desired, ordinary or well known manner, and the band is provided at its opposite end with an adjustable rod or threaded pin m which is mounted in threaded engagement with a lug or boss n upon the last-mentioned end of the brake band or metallic member d. This boss or lug n is provided with a perforated flange or base o which is curved or segmental in form and adapted to snugly engage the outer surface of the curved or annular brake band d to which it is secured by means of bolts p and nuts q, as shown in Fig. 1, or in any desired, ordinary or well known manner. The threaded rod or adjustable pin m is provided with nuts r and s in threaded engagement therewith on opposite sides of the lug or boss n, and washers t may be interposed between the nuts r and s and said lug or boss, and jam nuts or lock nuts u are mounted in engagement with and adapted to securely hold the nuts r and s in position. The jam nuts u and nuts r and s and the lug n are thus adapted to hold the threaded rod or pin m in any desired adjusted position. The rod or pin k is provided with an eye or aperture v' in its free end, and the rod or pin m is provided with a similar eye or aperture w, by means of which said rods k and m are adapted to be operatively connected with suitable operating levers or operating mechanism for setting and releasing the brake. The operating levers or mechanism may be of any desired, ordinary or well known form, and it is therefore deemed unnecessary to describe or illustrate the same herein.

The material or composition above described is suitable for the making of shoes or linings, or friction members for brake shoes, brake bands, clutches, or other or similar articles. The rims and the entire bodies of friction gears or wheels, which may be of any desired type, are made of this material or composition; said material or composition in being molded in the form of a friction gear wheel is, while in the mold, subjected to heat sufficient to vulcanize the binder or cementitious material, as already described, and the particles of metal may be used in any desired proportions as indicated, or may be omitted. The pressure should, by preference, in all cases be maintained during the application of heat for vulcanizing or during the process of vulcanizing and until the cementitious material has become hard or vulcanized to the desired extent. This material and molded articles made therefrom will last much longer than bass wood or other hard woods when subjected to friction, and brake shoes, friction gear wheels or other wheels, clutches or similar articles made or molded from said material or composition are very strong, durable and efficient in operation.

I claim:

1. A composition for brake linings or similar articles comprising, in combination, a major portion of fibrous asbestos, cementitious material containing rubber and sulfur, and a filler containing a finely divided solid substance, all intermixed and forming a rigid body having the characteristics of a rigid mass condensed and hardened by compression and vulcanization.

2. A brake lining formed of a composition containing a major portion of fibrous asbestos, cementitious material containing rubber, and sulfur, and a filler comprising a finely divided solid substance, all intermixed and forming a rigid body having the characteristics of a rigid mass containing said elements and condensed and hardened by compression and vulcanization, substantially as described.

3. A composition for brake linings or similar articles containing intermixed fibrous asbestos, finely divided particles of metal, cementitious material containing rubber and sulfur, and a filler comprising a finely divided solid substance, all intermixed and forming a rigid body having the characteristics of a mass containing said elements and condensed and hardened by compression and vulcanization, substantially as described.

4. A brake shoe member formed of a composition comprising, in combination, a major portion of fibrous material containing fibrous asbestos, cementitious material containing rubber and sulfur, and a filler comprising a finely divided solid mineral substance, all intermixed and forming a rigid body having the characteristics of a rigid mass condensed and hardened by compression and vulcanized.

In testimony that I claim the foregoing as my invention I affix my signature, in the presence of two witnesses, this 6th day of May, A. D. 1913.

FRANK A. HEADSON.

Witnesses:
HATTIE B. LEHMAN,
CLARA L. PEOPLES.